United States Patent

[11] 3,581,049

[72] Inventor Lou C. Creith
 Allentown, Pa.
[21] Appl. No. 875,991
[22] Filed Nov. 12, 1969
[45] Patented May 25, 1971
[73] Assignee Olin Corporation

[54] SEMIAUTOMATIC WELD APPARATUS WITH MEANS FOR CHANGING ELECTRODE ANGULAR DISPOSITION
 12 Claims, 5 Drawing Figs.
[52] U.S. Cl. .................................................. 219/125,
  74/89, 219/138, 219/142
[51] Int. Cl. .................................................. B23k 9/12
[50] Field of Search ........................................ 219/124,
  125 (PL), 126, 138, 139, 140, 141, 142, 143, 4;
  74/89, 96

[56] References Cited
 UNITED STATES PATENTS
 1,539,383  5/1925  Bienenstok .................. 219/125X
 2,301,108  11/1942  Churchward ................. 219/141
 2,373,161  4/1945  Brandt ........................ 219/144
 2,818,493  12/1957  Pilia et al. ................... 219/125
 3,084,246  4/1963  Rieppel et al. ............... 219/125
 3,201,561  8/1965  Damon ........................ 219/125

Primary Examiner—J. V. Truhe
Assistant Examiner—L. A. Schutzman
Attorneys—Robert H. Bachman and Gordon G. Menzies ABSTRACT: A device for varying the angle of inclination between a welding torch and a workpiece. The device is employed in a semiautomatic welding apparatus which includes means for guiding a welding torch along a weld seam at a predetermined rate. The device comprises two cylinders each having a hole bored through it end to end, with the longitudinal axis of the bore canted with respect to the longitudinal axis of the cylinder. One cylinder fits within the bore of the other and the welding torch is placed in the bore of the inner cylinder. The angle at which the welding torch is inclined to the workpiece can be varied by rotating the cylinders with respect to each other and with respect to the welding torch barrel. After obtaining a desired angle of inclination, both the cylinders and the torch barrel are locked in place.

INVENTOR:
LOU C. CREITH

ATTORNEY

INVENTOR:
LOU C. CREITH

BY Robert N. Bachma
ATTORNEY

SEMIAUTOMATIC WELD APPARATUS WITH MEANS FOR CHANGING ELECTRODE ANGULAR DISPOSITION

The angle at which a welding torch is inclined to the weldment has an important bearing on the quality of the weld. The instant invention provides a means by which this angle can be varied to any degree from 0° up to a given maximum. The means for accomplishing this object consists of two cylinders, each having a hole bored through it end to end, with the longitudinal axis of the bore canted with respect to the longitudinal axis of the cylinder. The outside diameter of one cylinder is made slightly smaller than the outside diameter of the other. The inside diameter of the smaller cylinder is sized to accommodate the desired welding torch barrel. When the welding torch is placed into the smaller cylinder, and the smaller cylinder, into the larger, the angle at which the torch is inclined to the workpiece can be varied by rotating the cylinders with respect to each other and with respect to the welding torch barrel. It is then a simple matter to clamp both cylinders in place when the desired angle is obtained.

The device of this invention for varying the angle of inclination between a welding torch and a workpiece is especially useful with semiautomatic welding apparatus such as disclosed in U.S. Pat. No. 3,201,561 granted Aug. 17, 1969, assigned to the assignee of the instant invention and that disclosed in U.S. Application Ser. No. 846,047, filed July 30, 1969, assigned to the assignee of the instant invention. The welding apparatus of U.S. Pat. No. 3,201,561 comprises an assembly which includes means for guiding a welding torch along a weld seam at a predetermined rate. However, the welding torch is clamped to the housing so that there is a fixed angle of inclination between it and the workpiece. In this apparatus it is not possible to change the angle of inclination except by remachining the housing.

Application Ser. No. 846,047 represents an improvement in the apparatus of U.S. Pat. No. 3,201,561 in that steering means is included so that the apparatus may easily traverse curved seams. However, this apparatus also employs a fixed angle of inclination between the welding torch and the workpiece.

It is important that the angle between the welding torch and the workpiece be variable. In shielded inert gas arc welding, it is desirable to be able to tilt the welding torch with respect to the workpiece so that it is easier for the operator to see the path being traversed by the arc. When the welding torch is so tilted, the arc points at the base metal just ahead of the molten metal pool which forms the weldment. An associated improvement resulting from tilting of the torch thusly, is the scavenging effect of the arc on the base metal ahead of the molten pool. As the arc impinges upon the workpiece, it removes oxide films ahead of it so they are not taken into the molten pool.

Inert gas shielding is often used in this process to prevent hydrogen pickup in the weld metal. For example, in aluminum welding the molten metal pool has a high affinity for hydrogen. On cooling, hydrogen is rejected because the solubility limit for it is lowered. This causes porosity in the weldment and a lowering of its strength.

While it is desirable to tilt the welding torch for the reasons enumerated above, there is a maximum angle permissible, which depends on the size of the molten metal pool which forms the weldment, the arc current and the inert gas pressure. If the angle is too great the inert gas shield does not cover the entire molten pool and there may be hydrogen pickup. Therefore, as the gas pressure increases the maximum angle permissible increases. Similarly, as the arc current and thereby the size of the molten pool increases, the maximum permissible angle decreases.

In practice, especially with respect to aluminum, it has been found necessary to maintain the angle between the welding torch and the workpiece between 90° and 75°. It is desirable to have this angle variable to take account of the gas pressure, the current in the arc and the size of the molten pool.

It is an object of this invention to provide means for varying the angle of inclination between a welding torch and a workpiece.

It is a further object of this invention to provide means for varying the angle between the welding torch and a workpiece which may be incorporated in the semiautomatic welding apparatus.

It is a still further object of this invention to provide means for varying the angle between a welding torch and a workpiece with the means being incorporated in a semiautomatic welding apparatus which includes means for guiding a welding torch along a weld seam at a predetermined rate.

Other objects will become apparent to those skilled in the art as a detailed discussion of a particular embodiment proceeds with reference to the drawings which form a part hereof, in which:

FIG. 1 is a side elevation view of a welding apparatus in accordance with this invention incorporating means for varying the angle between the welding torch and the workpiece.

FIGS. 2A and B shows perspective views of the components of the means for varying the angle between the welding torch and the workpiece.

Figure 1:
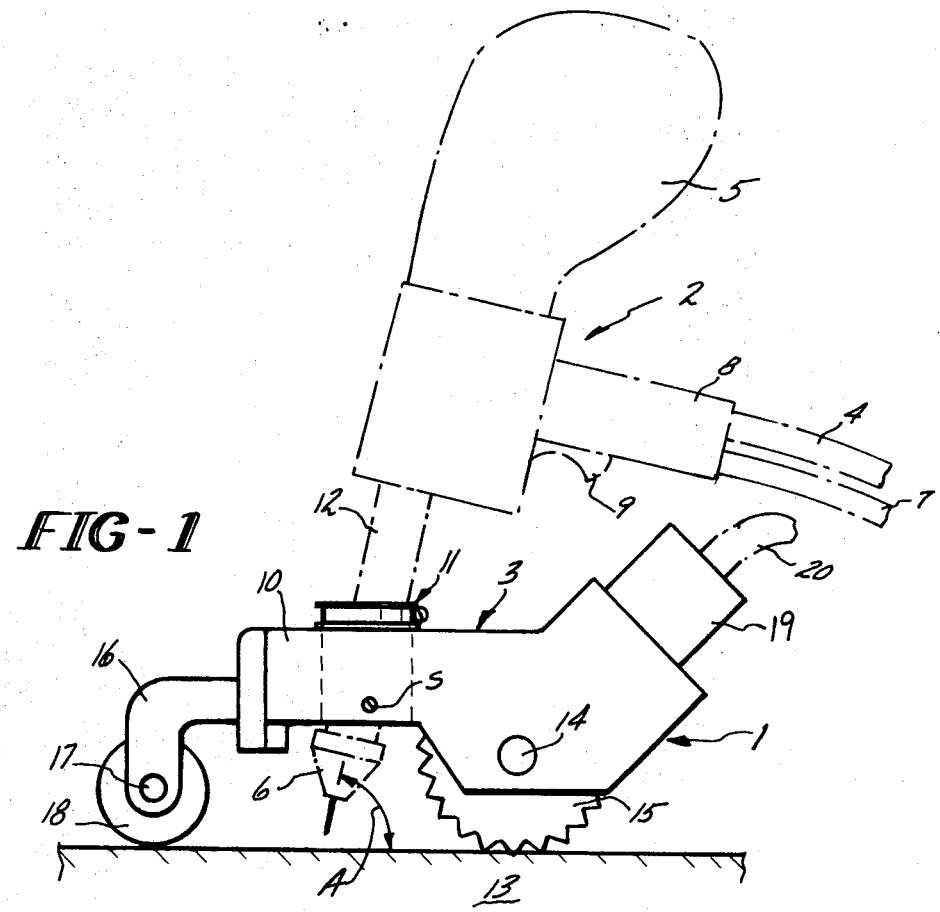

Referring now to the drawings and especially to FIG. 1, there is illustrated an apparatus in accordance with this invention identified generally by 1 comprising a hand operated MIG welding unit 2 supported in and carried by a carriage assembly 3. The welding unit 2 is of a conventional type, for example, that which may be obtained from Westinghouse Electric Company (SA-100) or Union Carbide Company (SWM-9). The welding unit 2 includes inert gas supply means 4, a supply of weld wire 5, and a welding tip 6. Electrical power is delivered to the welding unit 2 through a suitable cable 7 which extend from an appropriate exterior circuit, not shown. The welding unit 2 may be grasped from its handle 8 and selectively actuated by the trigger 9.

The carriage assembly 3 comprises a housing 10 to which is affixed the device of this invention 11 through which may be passed the barrel 12 of the welding unit 2. The welding unit 2 is secured to the housing 10 with a desired angle A between the welding tip 6 and the workpiece 13 or the seam to be welded. The device of this invention 11 for varying the angle A of inclination between the welding tip 6 and the workpiece 13 or the seam to be welded, will be discussed in more detail below. At the rear portion of the housing 10, there is supported an axle 14 which in turn supports a knurled drive wheel 15. At the front portion of the housing 10, there is located a pair of split arms 16 between which there is supported an axle 17 for mounting of a guide wheel 18. Suitably connected to the drive wheel 15 and located in the rear portion of the housing 10 is an adjustable-speed-drive motor assembly 19, for delivering adjustable-speed-drive to the drive wheel 18. Such a motor assembly 19 may be of any conventional type, for example, that obtainable from Universal Electric Company, Model 7–039. Electric power for the motor assembly 19 is supplied through a suitable cable 20 extending from an electrical circuit, not shown.

Figure 2A:
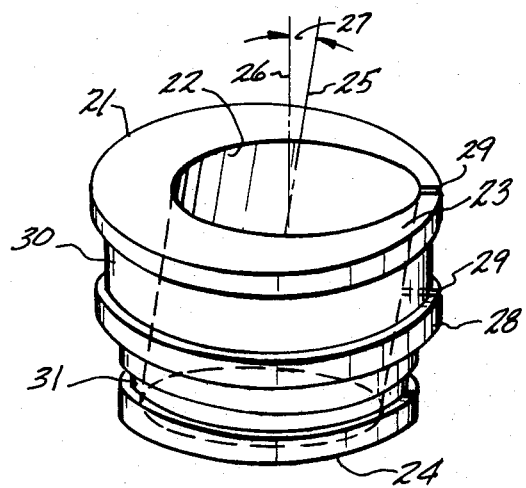
Figure 2B:
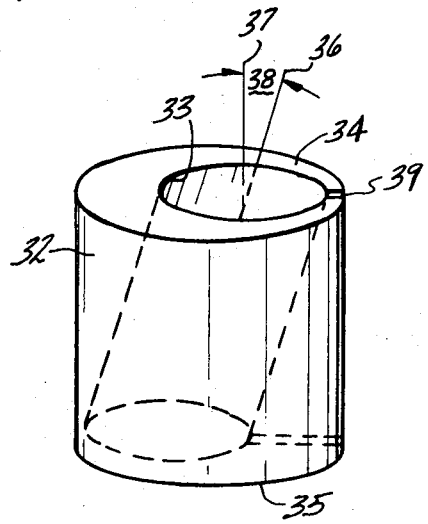

The device of this invention 11 for varying the angle of inclination A between the welding tip 6 and the workpiece 13 comprises two cylinders as shown in FIGS. 2A and 2B. FIG. 2A shows the outer cylinder 21. The outer cylinder 21 has a bore 22 through it from end 23 to end 24. The longitudinal axis 25 of the bore 22 is canted with respect to the longitudinal axis 26 of the cylinder 21. The degree of canting or the angle 27 between the longitudinal axis 26 of the cylinder 21 and the longitudinal axis 25 of the bore 22 is governed by the amount of space available in the cylinder 21 and by the maximum angle desired between the welding tip 6 and the workpiece 13. In practice, the axis 25 of the bore 22 may be canted with respect to the axis 26 of the cylinder 21 an amount up to 10° though preferably it should not exceed 7½° so as to avoid the problems discussed previously. A very practical value would be 5°. The outer cylinder 21 also contains a flange portion 28 which acts as a restraining means when the cylinder 21 is inserted in the housing 10. The cylinder is also slit at 29 so that it may be squeezed together to provide a clamping action. The flange portion contains a slot 30 which is adapted to support a suitable clamping means. The lower portion of the cylinder 21 which sits in the housing 10 also contains a slot 31 which is engaged by a set screw S to lock the cylinder 21 in place.

The inner cylinder 32, as shown in FIG. 2B, has a bore 33 through it from end 34 to end 35 with longitudinal axis 36 of the bore 33 being canted with respect to the longitudinal axis 37 of the cylinder 32 a desired amount. In practice, the degree of canting or the angle 38 between the axis 36 of the bore 33 and the axis 37 of the cylinder 32 will be the same as for the outer cylinder 21. This enables the angle A between the welding tip 6 and the workpiece 13 to be varied between about 90° and about 70° to 75°.

If the angle of canting 27 and 38, respectively, in both cylinders 21 and 32, respectively, is not the same then it will not be possible to obtain a 90° angle A between the welding tip 6 and the workpiece 13. Therefore, it is preferable that the degree of canting 27 and 38 be the same for both cylinders 21 and 32. However, if it is not necessary to employ a 90° angle A it would be possible to obtain even greater tilts by employing different degrees of canting 27 and 38 for the cylinders 21 and 32, respectively. The inner cylinder 32 also is slit at 39 so that when clamping pressure is applied to the cylinder 32 it will clamp and lock the barrel 12 of the welding unit 2 which fits within its bore 33.

If desired, the ends of the inner cylinder 32 may be finished off such that planes passing through the end surfaces 34 and 35 are at an angle to the longitudinal axis 36 of the inner cylinder 32 which is equal to the degree of canting 27 between the bore 22 and axis 26 of the outer cylinder 21. The advantage of this approach is that in use, the end surfaces 34 and 35 of the inner cylinder 32 would be coplanar with the end surfaces 23 and 24 of the outer cylinder 21.

Figure 3:
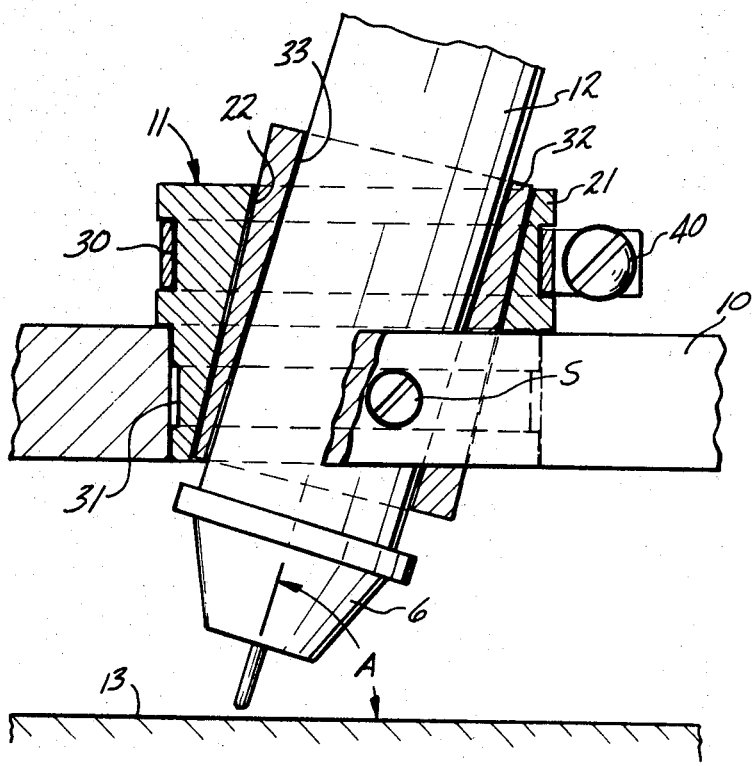
FIG. 3 is a cross-sectional view showing the means for varying the angle between the welding torch and the workpiece of this invention, incorporated in a suitable housing.

In operation, the device 11 of this invention would be positioned in the housing 10 of the welding apparatus 1 as shown in FIG. 1. FIG. 3 better shows the positioning of the device 11 of this invention in the housing 10. The welding torch barrel 12 is placed within the bore 33 of the inner cylinder 32 and the inner cylinder 32 is placed within the bore 22 of the outer cylinder 21. The angle A of inclination between the welding tip 6 and the workpiece 13 may be varied by rotating the outer cylinder 21 with respect to the inner cylinder 32 or the inner cylinder 32 with respect to the welding torch barrel 12 or a combination thereof. If, for example, the cylinders 21 and 32 have their bores 22 and 33 canted at an angle of 5° to their respective longitudinal axes 26 and 37, the angle A between the welding tip 6 and the workpiece 13 can be varied between 90° and 80°.

Figure 4:
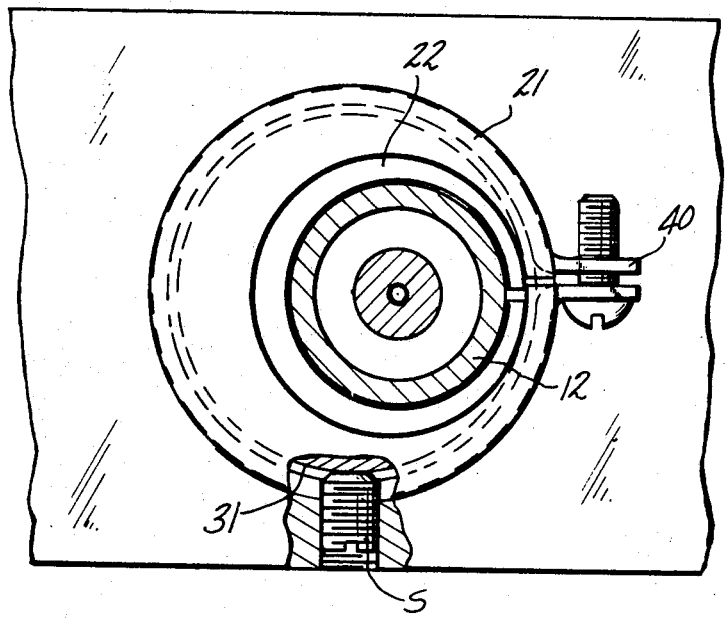
FIG. 4 is a bottom view of the device shown in FIG. 3.

When the desired angle A is obtained, the assembly 11 is locked in place by means of clamp 40 which applies pressure to the outer cylinder 21 which in turn applies pressure to the inner cylinder 32, closing them tightly around the welding gun barrel 12. By tightening the set screw S the whole assembly 11 is prevented from rotating in the housing 10 and is locked in place. The engagement between the set screw S with the device of the invention 11 is better shown in FIG. 4. As previously pointed out, the clamp 40 is held within the slot 30 in the upper flange portion of the outer cylinder 21. The set screw S engages the slot 31 in the lower portion of the outer cylinder 21 and is effective to prevent rotation and lock the assembly 11 in place.

As will be obvious to those skilled in the art, various materials might be employed in the apparatus of the instant invention. It has been found best to construct the guide wheel 18 of a strong polymer such as Teflon and the drive wheel 15 of a knurled steel roll. The inner and outer cylinders 21 and 32 of this invention should be constructed of a heat resisting material, which is preferably also an insulator. A suitable material is Micarta.

The character of the gun and weld wire employed will obviously depend on the material to be welded. For instance, in welding aluminum from 0.040 inch to approximately 0.125 inch, a MIG gun using a 1-pound coil of wire is recommended. In welding material higher than 0.125 inch, a water cooling gun which houses a 10-pound coil will present the best results. Usually 0.030 inch diameter wire is recommended for the 1-pound support gun, but in certain conditions, one might use 0.048 inch diameter wire. When employing a 10-pound coil, either 0.048 inch or 0.062 inch filler can be used.

By appropriate external means, it will be seen that the power to the motor and the power to the welding unit may be coordinated with the supply of inert gas to achieve the desired and required relationship between the weld rate and the rate of travel of the unit. In use, it will be evident that the welding apparatus is placed upon the seam to be welded. The angle between the welding tip 6 and the workpiece 13 is adjusted by rotating the outer cylinder 21 with respect to the inner cylinder 32 and the inner cylinder 32 with respect to the welding torch barrel 12 as set forth above. The guide wheel 18 has a periphery of a configuration mating with the seam to be welded. When the unit is actuated, the guide wheel 18 will follow the seam whatever pattern it might take. As power is supplied to the motor, the knurled drive wheel 15 grips the surface of the workpiece 13 and drives the assembly. Simultaneously, a controlled delivery of inert gas is supplied through 4 and a controlled delivery of welding wire is fed to the welding tip 6. The welding tip 6 may be spaced above the workpiece 13 by appropriately positioning the barrel 12 of the welding torch in the inner cylinder 32. The desired power and gas input may be coordinated by a control unit external to the welding unit and the operator, after having made the required selections merely actuates the unit by pressing the trigger.

As will be obvious, the thickness of the material being welded will also dictate the welding current and voltage as well as the travel rate of the welding unit. It will also affect the maximum angle at which the welding torch may be inclined to the workpiece as set forth above. Thereafter, the operator need only grasp the control and depress the trigger, to put the unit in operation.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope of the claims.

What I claim is:

1. A welding apparatus including means for varying the angle of inclination between a welding torch and a workpiece comprising:

a housing adapted to carry a welding torch along the workpiece;

a first cylinder mounted in said housing for rotation about its longitudinal axis, said first cylinder having first and second ends and a bore extending between said first and second ends of said first cylinder, said bore of said first cylinder having a longitudinal axis which is canted with respect to the longitudinal axis of said first cylinder;

a second cylinder positioned in said bore of said first cylinder for rotation about its longitudinal axis, said second cylinder having first and second ends and a bore extending between said first and second ends of said second cylinder said bore of said second cylinder having a longitudinal axis which is canted with respect to the longitudinal axis of said second cylinder; and a welding means rotatably positioned in the bore of said second cylinder, being operative to weld the workpiece.

2. A device as in claim 1 wherein the longitudinal axes of the bores of said first and said second cylinders are canted up to 10° from the longitudinal axis of said first and said second cylinders respectively.

3. A device as in claim 1 wherein the longitudinal axes of the bores of said first and said second cylinders are canted up to 7½° from the longitudinal axis of said first and said second cylinders respectively.

4. A device as in claim 2 wherein the longitudinal axes of the bores of said first and said second cylinders are canted 5° from the longitudinal axis of said first and said second cylinders respectively.

5. In a semiautomatic welding apparatus comprising: a frame,
guide wheel means connected to said frame for guiding said apparatus along a workpiece;
drive wheel means connected to said frame for propelling said apparatus along the workpiece at a controlled rate; and
welding means connected to said frame being operative to weld the workpiece;
the improvement wherein said apparatus includes means for varying the angle of inclination between said welding means and the workpiece said angle varying means comprising:
a first cylinder mounted in said frame for rotation about its longitudinal axis, said first cylinder having first and second ends and a bore extending between said first and second ends of said first cylinder, said bore of said first cylinder having a longitudinal axis which is canted with respect to the longitudinal axis of said first cylinder;
a second cylinder positioned in said bore of said first cylinder for rotation about its longitudinal axis, said second cylinder having first and second ends and a bore extending between said first and second ends of said second cylinder, said bore of said second cylinder having a longitudinal axis which is canted with respect to the longitudinal axis of said second cylinder; with
said welding means being rotatably positioned in the bore of said second cylinder.

6. A semiautomatic welding apparatus as in claim 5 wherein the longitudinal axes of the bores of said first and said second cylinders are canted up to 10° from the longitudinal axis of said first and said second cylinders respectively.

7. A semiautomatic welding apparatus as in claim 5 wherein the longitudinal axes of the bores of said first and said second cylinders are canted up to 7½° from the longitudinal axis of said first and said second cylinders respectively.

8. A semiautomatic welding apparatus as in claim 5 wherein the longitudinal axes of the bores of said first and said second cylinders are canted 5° from the longitudinal axis of said first and said second cylinders respectively.

9. A semiautomatic welding apparatus comprising: a frame,
guide wheel means connected to said frame, for guiding said apparatus along a workpiece;
drive wheel means connected to said frame, for propelling said apparatus along the workpiece;
welding means rotatably connected to said frame, being operative to weld the workpiece;
steering means connected to said frame, for steering said apparatus along the workpiece;
the improvement wherein said apparatus includes means for varying the angle of inclination between said welding means and a workpiece, said angle varying means comprising:
a first cylinder mounted in said frame for rotation about its longitudinal axis, said first cylinder having first and second ends and a bore extending between said first and second ends of said first cylinder, said bore of said first cylinder having a longitudinal axis which is canted with respect to the longitudinal axis of said first cylinder;
a second cylinder positioned in said bore of said first cylinder for rotation about its longitudinal axis, said second cylinder having first and second ends and a bore extending between said first and second ends of said second cylinder, said bore of said second cylinder having a longitudinal axis which is canted with respect to the longitudinal axis of said second cylinder; with
said welding means being rotatably positioned in the bore of said second cylinder.

10. A semiautomatic welding apparatus as in claim 9 wherein the longitudinal axes of the bores of said first and said second cylinders are canted up to 10° from the longitudinal axis of said first and said second cylinders respectively.

11. A semiautomatic welding apparatus as in claim 9 wherein the longitudinal axes of the bores of said first and said second cylinders are canted up to 7½° from the longitudinal axis of said first and said second cylinders respectively.

12. A semiautomatic welding apparatus as in claim 9 wherein the longitudinal axes of the bores of said first and said second cylinders are canted 5° from the longitudinal axis of said first and said second cylinders respectively.